(12) United States Patent
Mu (10) Patent No.: US 11,975,610 B2
(45) Date of Patent: May 7, 2024

(54) HYBRID POWER SYSTEM, AND OPERATING METHOD, TORQUE DISTRIBUTION METHOD AND GEAR SHIFTING CONTROL METHOD OF THE SAME

(71) Applicant: SCHAEFFLER TECHNOLOGIES AG & CO. KG, Herzogenaurach (DE)

(72) Inventor: Xinke Mu, Jiangsu (CN)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 463 days.

(21) Appl. No.: 17/291,428

(22) PCT Filed: Nov. 15, 2018

(86) PCT No.: PCT/CN2018/115740
§ 371 (c)(1),
(2) Date: May 5, 2021

(87) PCT Pub. No.: WO2020/097885
PCT Pub. Date: May 22, 2020

(65) Prior Publication Data
US 2022/0118845 A1   Apr. 21, 2022

(51) Int. Cl.
*B60K 6/547* (2007.10)
*B60K 6/24* (2007.10)
*B60K 6/26* (2007.10)
*B60K 6/28* (2007.10)
*B60K 6/36* (2007.10)
*B60K 6/38* (2007.10)
(Continued)

(52) U.S. Cl.
CPC .............. *B60K 6/547* (2013.01); *B60K 6/24* (2013.01); *B60K 6/26* (2013.01); *B60K 6/28* (2013.01);
(Continued)

(58) Field of Classification Search
CPC ......... B60K 6/547; B60K 6/36; B60W 10/02; B60W 10/10
See application file for complete search history.

(56) References Cited

U.S. PATENT DOCUMENTS 10,850,599 B2 * 12/2020 Lian .................. B60K 17/02
2016/0137045 A1    5/2016 Zhu et al.
(Continued)

FOREIGN PATENT DOCUMENTS

CN        103415410 A     11/2013
CN        106573529 A      4/2017
(Continued)

*Primary Examiner* — Katy M Ebner (57) ABSTRACT

A hybrid power system and an operating method, a torque distribution method and a gear shifting control method of the same. A transmission of the hybrid power system employs two independent input shafts and two motors which are in transmission connection with the two input shafts respectively, and an engine is in transmission connection with one of the two motors via a clutch. In this way, in one aspect, a torque compensation can be constantly carried out in a gear shift process of the hybrid power system, thereby avoiding a torque interruption phenomenon for the hybrid power system in the gear shift process; in the other aspect, the hybrid power system can enable a serial mode in which one motor is driven by the engine to charge a battery while the other motor is driven to transmit torque to the transmission for driving.

19 Claims, 5 Drawing Sheets

(51) Int. Cl.
*B60W 10/02* (2006.01)
*B60W 10/06* (2006.01)
*B60W 10/08* (2006.01)
*B60W 10/10* (2012.01)
*B60W 20/13* (2016.01)
*B60W 20/15* (2016.01)
*F16H 3/089* (2006.01)

(52) U.S. Cl.
CPC .......... *B60K 6/36* (2013.01); *B60K 6/38* (2013.01); *B60W 10/02* (2013.01); *B60W 10/06* (2013.01); *B60W 10/08* (2013.01); *B60W 10/10* (2013.01); *B60W 20/13* (2016.01); *B60W 20/15* (2016.01); *F16H 3/089* (2013.01); *B60Y 2200/92* (2013.01)

(56) References Cited

U.S. PATENT DOCUMENTS

| | | | | |
|---|---|---|---|---|
| 2016/0144702 A1* | 5/2016 | Byun | ............... | F16H 3/006 180/65.23 |
| 2016/0207392 A1* | 7/2016 | Zhang | ............... | B60K 6/52 |
| 2017/0122419 A1 | 5/2017 | Kaltenbach | | |
| 2018/0126839 A1* | 5/2018 | Park | ............... | F16H 3/10 |
| 2019/0308495 A1* | 10/2019 | Lian | ............... | B60K 6/485 |
| 2023/0009105 A1* | 1/2023 | Kwon | ............... | B60K 6/547 |

FOREIGN PATENT DOCUMENTS

| | | | | |
|---|---|---|---|---|
| CN | 106585362 A | | 4/2017 | |
| CN | 107867163 A | * | 4/2018 | ............ B60K 17/02 |
| CN | 108116215 A | | 6/2018 | |
| CN | 108382187 A | | 8/2018 | |
| CN | 108482362 A | | 9/2018 | |
| CN | 110576731 A | | 12/2019 | |
| DE | 102017201175 A1 | | 7/2018 | |
| JP | 2010076680 A | | 4/2010 | |
| KR | 101459490 B1 | | 11/2014 | |
| KR | 101500203 B1 | | 3/2015 | |
| KR | 101510053 B1 | | 4/2015 | |
| WO | 2020014915 A1 | | 1/2020 | |

\* cited by examiner

HYBRID POWER SYSTEM, AND OPERATING METHOD, TORQUE DISTRIBUTION METHOD AND GEAR SHIFTING CONTROL METHOD OF THE SAME

CROSS-REFERENCE TO RELATED APPLICATIONS

This application is the U.S. National Phase of PCT/CN2018/115740 filed Nov. 15, 2018, the entire disclosure of which is incorporated by reference herein.

TECHNICAL FIELD

The present disclosure relates to the field of vehicles, in particular to a hybrid power system, and an operating method, torque distribution method, and gear shifting control method of the same.

BACKGROUND

Figure 1:
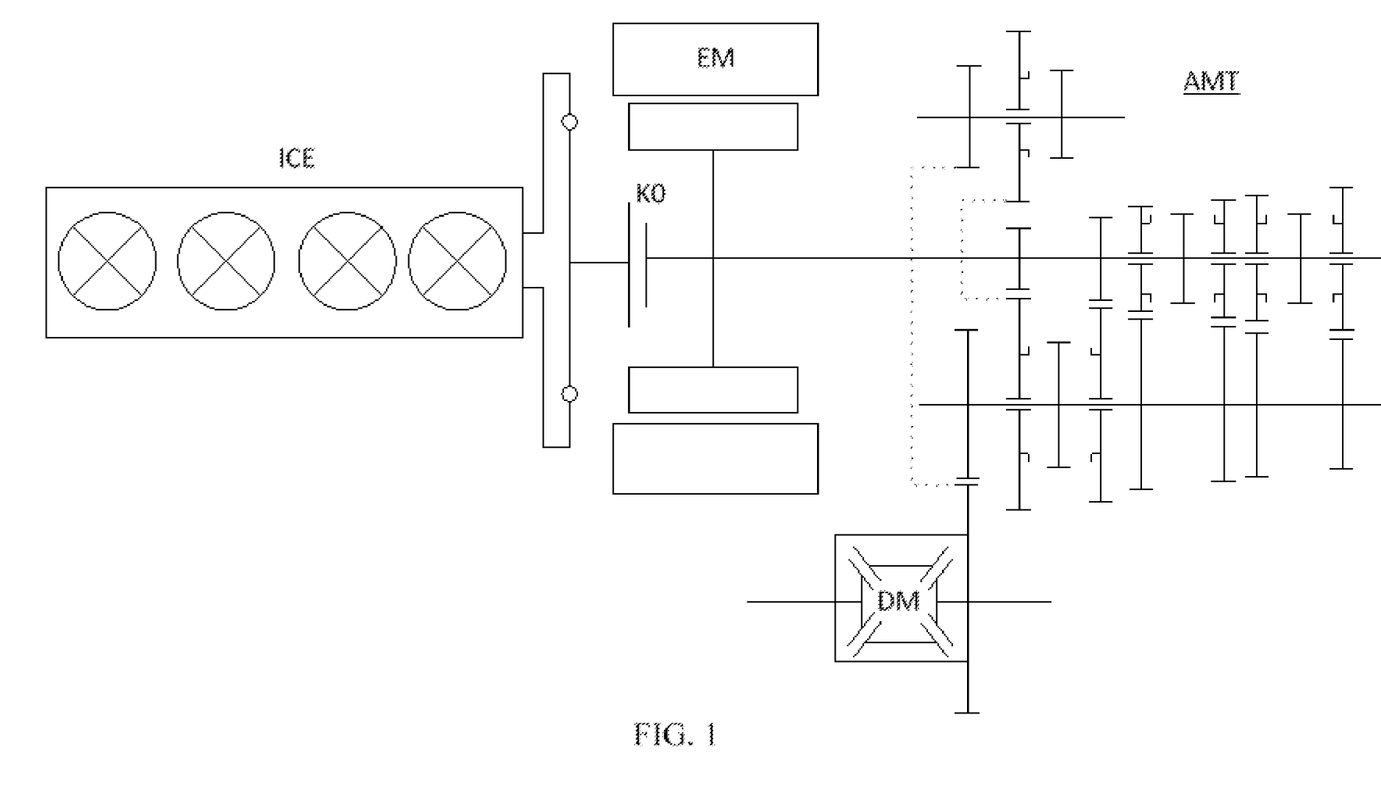
FIG. 1 illustrates a schematic diagram of a connection structure of a hybrid power system according to the prior art.

As shown in FIG. 1, there is a hybrid power system as described below in the prior art, comprising an engine ICE, a motor EM, a clutch K0, a transmission AMT, and a differential mechanism DM. An output shaft of the engine ICE is in transmission connection with an input/output shaft of the motor EM via a clutch K0, and the input/output shaft of the motor EM is directly and coaxially connected with the only one input shaft of the transmission AMT. The transmission AMT comprises an input shaft, an output shaft, and a reverse gear shaft that are arranged in parallel and spaced apart from one another. A plurality of synchronous meshing mechanisms and a plurality of gearwheels are arranged on the above shafts, such that the above shafts can be engaged in different combinations via the plurality of synchronous meshing mechanisms and the plurality of gearwheels, and thereby be selectively in transmission connection. An outer ring gear of the differential mechanism DM is in transmission connection with the output shaft of the transmission AMT, such that driving force/torque from the transmission AMT can be transmitted to wheels via the differential mechanism DM.

The hybrid power system described above has the following defects.

In one aspect, in a gear shift process of the hybrid power system, the torque of the input shaft of the transmission AMT needs to be decreased to 0 Nm such that the synchronous meshing mechanism retreats from an initial gear and then can be engaged with a target gear. In this process, the torque input to the transmission AMT may be interrupted, such that a torque interruption is perceptible to a driver in the gear shift process of the hybrid power system.

In the other aspect, a serial mode cannot be implemented since only a single motor EM is present in the hybrid power system.

SUMMARY

The present invention has been made in view of the deficiencies of the prior art as described above. An object of the present invention is to provide a novel hybrid power system in which a torque compensation can be carried out in the gear shift process to avoid a torque interruption phenomenon in the gear shift process and the serial mode also can be implemented.

A further object of the present invention is to provide an operating method, torque distribution method, and gear shifting control method of the hybrid power system described above.

To achieve the above objects, the following technical schemes are adopted.

The present invention provides a hybrid power system as described below. The hybrid power system comprises a transmission, wherein the transmission comprises a first input shaft, a second input shaft, an output shaft, and a plurality of synchronous meshing mechanisms and a plurality of gearwheels, the second input shaft sleeves the first input shaft, the output shaft and the first input shaft are independently rotatable, the output shaft is disposed in parallel with the first input shaft and the second input shaft at intervals, and the gearwheel arranged on the output shaft constantly meshes with the gearwheels arranged on the first input shaft and the second input shaft, such that the shafts can be selectively in transmission connection via the plurality of synchronous meshing mechanisms and the plurality of gearwheels; a first motor, wherein an input/output shaft of the first motor is in transmission connection with the first input shaft of the transmission; a second motor, wherein an input/output shaft of the second motor is in transmission connection with the second input shaft of the transmission; an engine and a clutch, wherein the engine is in transmission connection with the input/output shaft of the first motor via the clutch; and a battery electrically connected with the first motor and the second motor.

In one embodiment, the input/output shaft of the first motor is directly and coaxially connected with the first input shaft, and the input/output shaft of the second motor is in transmission connection with the second input shaft via a gearwheel transmission mechanism.

In one embodiment, the plurality of synchronous meshing mechanisms comprise a first synchronous meshing mechanism and a second synchronous meshing mechanism, the first synchronous meshing mechanism is arranged on the first input shaft, and the second synchronous meshing mechanism is arranged on the output shaft; a first gearwheel corresponding to the first synchronous meshing mechanism is arranged on the first input shaft, the first gearwheel constantly meshes with a second gearwheel fixed to the output shaft, a third gearwheel corresponding to the first synchronous meshing mechanism is fixed to the second input shaft, and the third gearwheel constantly meshes with a fourth gearwheel arranged on the output shaft; and the fourth gearwheel corresponds to the second synchronous meshing mechanism, a fifth gearwheel corresponding to the second synchronous meshing mechanism is arranged on the output shaft, and the fifth gearwheel constantly meshes with a sixth gearwheel fixed to the second input shaft.

In one embodiment, an eighth gearwheel fixed to the input/output shaft of the second motor meshes with a seventh gearwheel constantly serving as an intermediate gearwheel, the seventh gearwheel constantly meshes with the third gearwheel or the sixth gearwheel, and the seventh gearwheel and the eighth gearwheel constitute the gearwheel transmission mechanism.

In one embodiment, the hybrid power system further comprises a control module capable of controlling the hybrid power system to implement a pure motor driving mode, wherein when the hybrid power system is in the pure motor driving mode, the engine in a stopped state, the second motor is in an operating state and the first motor is in a stopped state, or the first motor and the second motor are both in an operating state, the clutch is disengaged, and the synchronous meshing mechanisms of the transmission are engaged with the corresponding gearwheels, such that the second motor transmits torque to the transmission for driving, or the first motor and the second motor both transmit torque to the transmission for driving.

In one embodiment, when the hybrid power system is in the pure motor driving mode, the first synchronous meshing mechanism is engaged with the first gearwheel, and the second synchronous meshing mechanism is engaged with the fifth gearwheel; or the first synchronous meshing mechanism is engaged with the first gearwheel, and the second synchronous meshing mechanism is engaged with the fourth gearwheel.

In one embodiment, when the hybrid power system is in the pure motor driving mode, a transmission ratio from the input/output shaft of the second motor to the output shaft of the transmission is greater than a transmission ratio from the input/output shaft of the first motor to the output shaft of the transmission.

In one embodiment, the hybrid power system can be controlled by the control module of the hybrid power system to implement a hybrid power driving mode, wherein when the hybrid power system is in the hybrid power driving mode, the engine is in the operating state, the first motor is in the operating state and the second motor is in the stopped state, or the first motor and the second motor are both in the operating state, the clutch is engaged, and the synchronous meshing mechanisms of the transmission are engaged with the corresponding gearwheels, such that the engine and the first motor transmit torque to the transmission for driving, or the engine, the first motor and the second motor transmit torque to the transmission for driving.

In one embodiment, when the hybrid power system is in the hybrid power driving mode, the first synchronous meshing mechanism is engaged with the third gearwheel and the second synchronous meshing mechanism is engaged with the fifth gearwheel; the first synchronous meshing mechanism is engaged with the first gearwheel and the second synchronous meshing mechanism is engaged with the fifth gearwheel; or the first synchronous meshing mechanism is engaged with the third gearwheel and the second synchronous meshing mechanism is engaged with the fourth gearwheel.

In one embodiment, the hybrid power system can be controlled by the control module of the hybrid power system to implement the serial mode, wherein when the hybrid power system is in the serial mode, the engine, the first motor and the second motor are all in the operating state, the clutch is engaged, the first synchronous meshing mechanism is located in the neutral position where the first synchronous meshing mechanism is disengaged from the corresponding gearwheels, and the second synchronous meshing mechanism is engaged with the fourth gearwheel or the fifth gearwheel, such that the engine transmits torque to the first motor to enable the first motor to charge the battery and the second motor to transmit torque to the transmission for driving.

In one embodiment, the hybrid power system can be controlled by the control module of the hybrid power system to implement an idle charge mode, wherein when the hybrid power system is in the idle charge mode, the engine is in the operating state, the first motor is in the operating state and the second motor is in the stopped state, the clutch is engaged, and the synchronous meshing mechanisms of the transmission are all in the neutral position, such that the engine transmits torque to the first motor to enable the first motor to charge the battery.

The present disclosure further provides an operating method of the hybrid power system according to any one of the technical schemes described above. The operating method comprises the followings: when the charge level of the battery of the hybrid power system is greater than or equal to a first predetermined threshold value and a requested driving power is less than the maximum battery output power of the battery, the hybrid power system employs the pure motor driving mode; when the charge level of the battery is less than the first predetermined threshold value and is greater than or equal to a second predetermined threshold value, the overall system efficiency of the hybrid power system in the pure motor driving mode and in the hybrid power driving mode is calculated respectively based on the thermal efficiency of the engine, the motor and the power electronic control average efficiency thereof and the charge/discharge efficiency of the battery, the overall system efficiency corresponding to the pure motor driving mode is compared with the overall system efficiency corresponding to the hybrid power driving mode, and the hybrid power system employs the driving mode bringing higher overall system efficiency; and when the charge level of the battery is less than the second predetermined threshold value, the hybrid power system employs the serial mode.

In one embodiment, when the charge level of the battery is less than the first predetermined threshold value and is greater than or equal to the second predetermined threshold value, the overall system efficiency corresponding to the pure motor driving mode is compared with the overall system efficiency corresponding to the hybrid power driving mode repeatedly, and when a switch between the pure motor driving mode and the hybrid power driving mode is required based on the comparison of the overall system efficiency, the switch is carried out by delaying a predetermined amount of time.

In one embodiment, the overall system efficiency corresponding to the pure motor driving mode and the overall system efficiency corresponding to the hybrid power driving mode are calculated according to the product of different parameters in the thermal efficiency of the engine, the motor and the power electronic control average efficiency thereof and the charge/discharge efficiency of the battery.

The present disclosure further provides a torque distribution method of the hybrid power system according to any one of the technical schemes described above. The torque distribution method comprises the followings: when the hybrid power system is in the pure motor driving mode, the torque of the second motor is set according to the requested torque, and when the requested torque is greater than the maximum rated torque of the second motor, the torque of the first motor is set based on a difference between the requested torque and the maximum rated torque of the second motor; and when the hybrid power system is in the hybrid power driving mode, the torque of the engine and the torque of the first motor are set according to the requested torque, and when the requested torque is greater than the sum of the torque of the engine and the torque of the first motor, the torque of the second motor is set based on a difference between the requested torque and the sum of the torque of the engine and the torque of the first motor.

The present disclosure further provides a gear shifting control method of the hybrid power system according to any one of the technical schemes described above. In the gear shifting control method, the torque compensation is carried out on the first motor when the hybrid power system shifts gears in the pure motor driving mode; and when the hybrid power system shifts gears in the hybrid power driving mode, the torque compensation is carried out on the engine and/or the first motor when the second synchronous meshing mechanism is disengaged from the corresponding gearwheel; and the torque compensation is carried out on the second motor when the first synchronous meshing mechanism is disengaged from the corresponding gearwheel.

In one embodiment, when the hybrid power system shifts gears, before the synchronous meshing mechanisms of the transmission are disengaged from the corresponding gearwheels, a torque transfer is carried out by the gear shifting control method to achieve the torque compensation.

In one embodiment, when the hybrid power system shifts gears in the pure motor driving mode, in a torque transfer process, the torque of the second motor is decreased and the torque of the first motor is increased, such that the torque compensation can be carried out on the first motor.

In one embodiment, when the hybrid power system shifts gears in the hybrid power driving mode, in the torque transfer process, when the gear shift is carried out by the second synchronous meshing mechanism, the torque of the second motor is decreased and the torque of the engine and/or the first motor is increased in the torque transfer process, such that the torque compensation can be carried out on the engine and/or the first motor; and when the gear shift is carried out by the first synchronous meshing mechanism in the hybrid power driving mode, the torque of the engine and the torque of the first motor are both decreased and the torque of the second motor is increased in the torque transfer process, such that the torque compensation can be carried out on the second motor.

By the adoption of the technical schemes described above, the present disclosure provides a novel hybrid power system, and an operating method, torque distribution method and gear shifting control method of the same. The transmission of the hybrid power system adopts two independent input shafts, and two motors being in transmission connection with the two input shafts respectively. The engine is in transmission connection with one of the two motors via the clutch. In this way, in one aspect, a torque compensation can be constantly carried out in a gear shift process of the hybrid power system, thereby avoiding a torque interruption phenomenon for the hybrid power system in the gear shift process; in the other aspect, the hybrid power system can enable a serial mode in which one motor is driven by the engine to charge a battery while the other motor is driven to transmit torque to the transmission for driving.

DESCRIPTION OF REFERENCE NUMERALS

ICE engine; EM motor; EM1 first motor; EM2 second motor; K0 clutch; AMT transmission; S1 first input shaft; S2 second input shaft; S3 output shaft; G 1-G8 gearwheels; A1 first synchronous meshing mechanism; A2 second synchronous meshing mechanism; DM differential mechanism; TI wheels

DETAILED DESCRIPTION OF THE DRAWINGS

Implementations of the present disclosure will be described below with reference to the drawings of the specification. In the present disclosure, the "transmission connection" may illustrate that driving force/torque can be transmitted between two components which, unless indicated otherwise, transmit driving force/torque using direct connection or via a gear mechanism.

(Structure of the Hybrid Power System)

Figure 2:
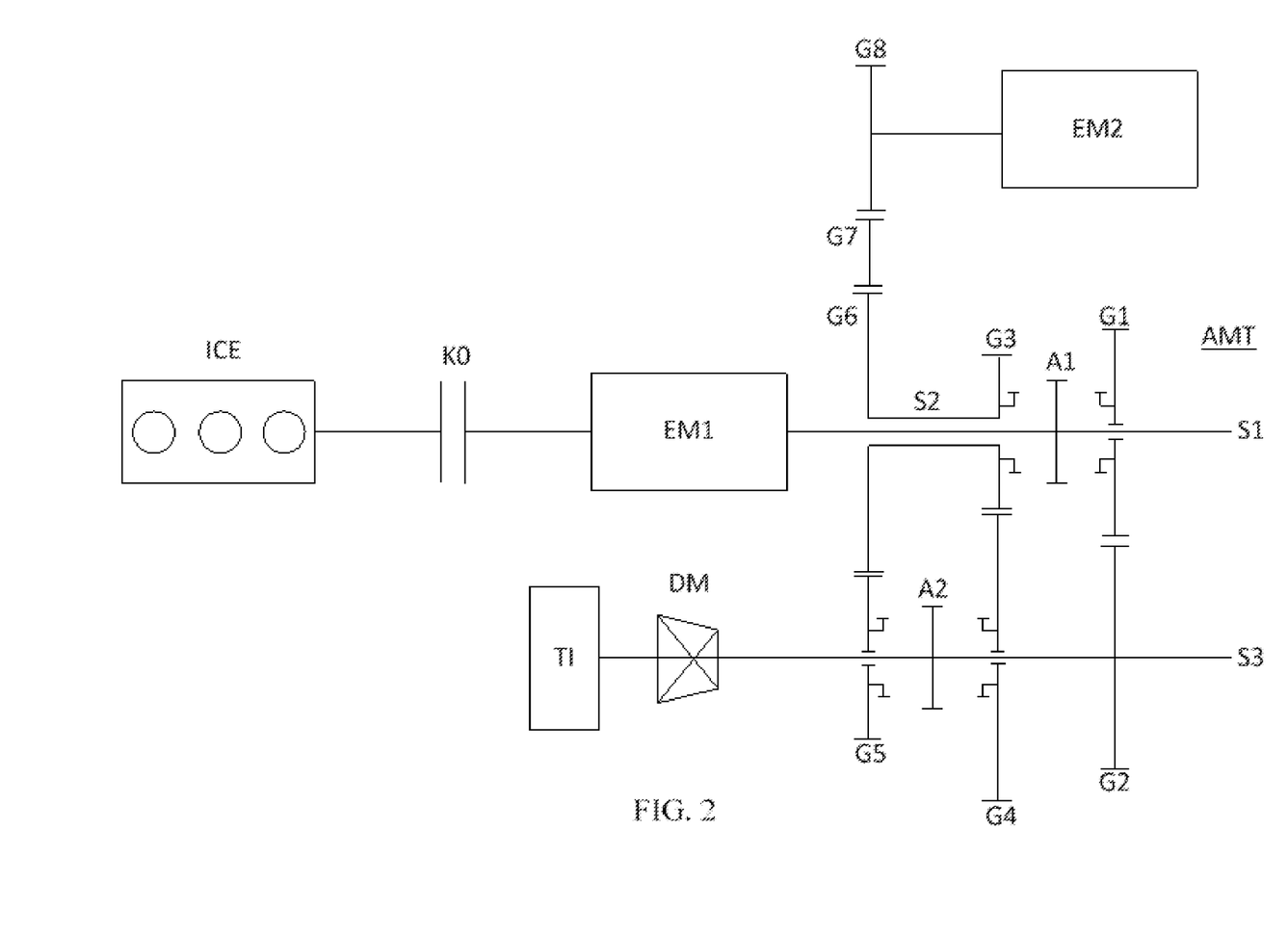
FIG. 2 illustrates a schematic diagram of a connection structure of a hybrid power system according to the present disclosure.

As shown in FIG. 2, the hybrid power system according to the present disclosure comprises an engine ICE, a first motor EM1, a second motor EM2, a clutch K0, a transmission AMT, a differential mechanism DM, and a battery (not shown).

Specifically, the engine ICE is, for example, a three-cylinder engine. The engine ICE is on the opposite side of the transmission AMT with respect to the first motor EM1, and an output shaft of the engine ICE is in transmission connection with an input/output shaft of the first motor EM1 via the clutch K0. When the clutch K0 is engaged, the output shaft of the engine ICE is in transmission connection with the input/output shaft of the first motor EM1; when the clutch K0 is disengaged, the transmission connection between the output shaft of the engine ICE and the input/output shaft of the first motor EM1 fails.

The clutch K0 is not a double clutch but a separate conventional clutch with only one clutch unit. The clutch K0 is, for example, a conventional friction clutch, and the structure of the clutch K0 is not specified here. In addition, it is not necessary to provide additional clutches in the transmission AMT, as the clutch K0 suffices for the hybrid power system.

The input/output shaft of the first motor EM1 is directly and coaxially connected with a first input shaft S1 of the transmission AMT, such that driving force/torque can be bidirectionally transmitted between the first motor EM1 and the transmission AMT. The "directly and coaxially connected" described above may illustrate that the input/output shaft of the first motor EM1 and the first input shaft S1 of the transmission AMT may be the same shaft, or that the input/output shaft of the first motor EM1 and the first input shaft S1 of the transmission AMT are directly and rigidly connected therebetween. When electric energy is supplied to the first motor EM1 by the battery (not shown), the first motor EM1 works as an electric motor to transmit driving force/torque to the first input shaft S1 of the transmission AMT; when the first motor EM1 obtains the driving force/torque from the engine ICE, the first motor EM1 works as an electric generator to charge the battery.

The input/output shaft of the second motor EM2 is in transmission connection with the second input shaft S2 of the transmission AMT via a gearwheel transmission mechanism (gearwheels G7 and G8), such that driving force/torque can be bidirectionally transmitted between the second motor EM2 and the transmission AMT. Specifically, the gearwheel G8 is fixed to the input/output shaft of the second motor EM2. The gearwheel G7 serving as an intermediate gear constantly meshes with the gearwheel G8, and meanwhile the gearwheel G7 also constantly meshes with the gearwheel G6 fixed to the second input shaft S2, wherein the gearwheel G7 is mainly used for adjusting the transmission ratio from the second motor EM2 to the output shaft S3.

The battery (not shown) is electrically connected with both the first motor EM1 and the second motor EM2, such that the battery can supply electrical energy to the first motor EM1 and the second motor EM2, and thereby the battery is charged by the first motor EM1 in a serial mode and an idle charge mode described below.

Further, as shown in FIG. 2, the transmission AMT comprises a first input shaft S1, a second input shaft S2, and an output shaft S3. The first input shaft S1 is a solid shaft, the second input shaft S2 is a hollow shaft, and the first input shaft S1 penetrates through the interior of the second input shaft S2, that is, the second input shaft S2 sleeves the first input shaft S1, and the central axis of the first input shaft S1 is consistent with that of the second input shaft S2. The first input shaft S1 and the second input shaft S2 are independently rotatable. The output shaft S3 is disposed in parallel with the first input shaft S1 and the second input shaft S2 at intervals.

In addition, the transmission AMT further comprises gearwheels (gearwheels G1-G6) used for constituting gear pairs corresponding to different gears, synchronous meshing mechanisms A1-A2 and an intermediate gear (gearwheel G7) used for constituting a gearwheel transmission mechanism. The first synchronous meshing mechanism AI is arranged on the first input shaft S1, and the second synchronous meshing mechanism A2 is arranged on the output shaft S3. Each of the synchronous meshing mechanisms A1 and A2 comprises a synchronizer and a gear actuator and corresponds to two gearwheels respectively, wherein the first synchronous meshing mechanism A1 corresponds to the gearwheels G1 and G3, and the second synchronous meshing mechanism A2 corresponds to the gearwheels G4 and G5.

Hereinafter, the gearwheels of the transmission AMT used for constituting gear pairs corresponding to the gears will be described.

The gearwheel G1 is arranged on the first input shaft S1, the gearwheel G2 is fixed to the output shaft S3, and the gearwheel G1 and the gearwheel G2 constantly mesh, so as to constitute a gear pair corresponding to one gear.

The gearwheel G3 is fixed to the second input shaft S2, the gearwheel G4 and the gearwheel G2 are arranged on the output shaft S3 in a spaced mode, and the gearwheel G3 and the gearwheel G4 constantly mesh, so as to constitute a gear pair corresponding to another gear.

The gearwheel G5 and the gearwheel G4 are arranged on the output shaft S3 at intervals, the gearwheel G6 and the gearwheel G3 are fixed to the second input shaft S2 at intervals, and the gearwheel G5 and the gearwheel G6 constantly mesh, so as to constitute a gear pair corresponding to a further gear.

In this way, by adopting the structure described above, the plurality of gearwheels G1-G6 of the transmission AMT mesh with one another to constitute gear pairs corresponding to the three gears of the transmission AMT respectively, and the synchronous meshing mechanisms A1-A2 can be engaged with or disengaged from the corresponding gearwheels to achieve a gear shift. When gear shift by the transmission AMT is needed, the synchronizers of the corresponding synchronous meshing mechanisms A1-A2 act to be engaged with the corresponding gearwheels to achieve selective transmission connection or disconnection among the shafts.

Further, the second input shaft S2 is constantly in transmission connection with the input/output shaft of the second motor EM2 via the gearwheel G6, the gearwheel G7, and the gearwheel G8 fixed to the input/output shaft of the second motor EM2.

The differential mechanism DM is in transmission connection with the output shaft S3 of the transmission AMT, wherein the differential mechanism DM is not included in the transmission AMT, but the differential mechanism DM may be integrated into the transmission AMT as desired.

In this way, the driving force/torque from the engine ICE, the first motor EM1 and/or the second motor EM2 can be transmitted to the differential mechanism DM via the transmission AMT so as to be further output to the wheels TI of a vehicle.

The specific structure of the hybrid power system according to the present disclosure is described in detail above, and an operating method of the hybrid power system will be described below.

(Operating Method)

First, the operating mode of the hybrid power system in FIG. 2 will be described. The specific operating mode of the hybrid power system in FIG. 2 and the states of the clutch K0, the first synchronous meshing mechanism A1, and the second synchronous meshing mechanism A2 in each operating mode are shown in Table 1 below.

TABLE 1

| | Clutch K0 | First Synchronous Meshing Mechanism A1 | Second Synchronous Meshing Mechanism A2 |
|---|---|---|---|
| First Pure Motor Driving Mode | Disengaged | Right | Left |
| Second Pure Motor Driving Mode | Disengaged | Right | Right |
| First Hybrid Power Driving Mode | Engaged | Left | Left |
| Second Hybrid Power Driving Mode | Engaged | Right | Left |
| Third Hybrid Power Driving Mode | Engaged | Left | Right |
| Idle Charge Mode | Engaged | Neutral Position | Neutral Position |
| Serial Mode | Engaged | Neutral Position | Right/Left |

Specifically, as shown in Table 1 above, the hybrid power system can be controlled by the control module (not shown) of the hybrid power system to implement a first pure motor driving mode and a second pure motor driving mode.

When the hybrid power system is in the first pure motor driving mode,
the engine ICE is in a stopped state;
the second motor EM2 is in an operating state and the first motor EM1 is in the stopped state, or the first motor EM1 and the second motor EM2 are both in the operating state;
the clutch K0 is disengaged;
in the transmission AMT, the first synchronous meshing mechanism A1 is engaged with the gearwheel G1, and the second synchronous meshing mechanism A2 is engaged with the gearwheel G5.

In this way, the second motor EM2 transmits torque individually to the differential mechanism DM for driving via the gearwheel G8, the gearwheel G7, the gearwheel G6, the gearwheel G5 and the output shaft S3 sequentially, or the first motor EM1 and the second motor EM2 transmit torque to the differential mechanism DM for driving via the gearwheel G8, the gearwheel G7, the gearwheel G6, the gearwheel G5 and the output shaft S3 sequentially, and via the first input shaft S1, the gearwheel G1, the gearwheel G2 and the output shaft S3 sequentially, respectively.

When the hybrid power system is in the first pure motor driving mode,
the engine ICE is in a stopped state;
the second motor EM2 is in an operating state and the first motor EM1 is in the stopped state, or the first motor EM1 and the second motor EM2 are both in the operating state;
the clutch K0 is disengaged;
in the transmission AMT, the first synchronous meshing mechanism A1 is engaged with the gearwheel G1, and the second synchronous meshing mechanism A2 is engaged with the gearwheel G5.

In this way, the second motor EM2 transmits torque individually to the differential mechanism DM for driving via the gearwheel G8, the gearwheel G7, the gearwheel G6, the gearwheel G5 and the output shaft S3 sequentially, or the first motor EM1 and the second motor EM2 transmit torque to the differential mechanism DM for driving via the gearwheel G8, the gearwheel G7, the gearwheel G6, the gearwheel G5 and the output shaft S3 sequentially, and via the first input shaft S1, the gearwheel G1, the gearwheel G2 and the output shaft S3 sequentially, respectively.

Further, as shown in Table 1, the hybrid power system can be controlled by the control module of the hybrid power system to implement a first hybrid power driving mode, a second hybrid power driving mode, and a third hybrid power driving mode.

When the hybrid power system is in the first hybrid power driving mode,
the engine ICE is in an operating state,
the first motor EM1 is in the operating state and the second motor EM2 is in a stopped state, or the first motor EM1 and the second motor EM2 are both in the operating state,
the Clutch K0 is engaged,
in the transmission AMT, the first synchronous meshing mechanism A1 is engaged with the gearwheel G3, and the second synchronous meshing mechanism A2 is engaged with the gearwheel G5.

In this way, the engine ICE and the first motor EM1 transmit torque to the differential mechanism DM for driving via the first input shaft S1, the gearwheel G3, the second input shaft S2, the gearwheel G6, the gearwheel G5 and the output shaft S3 sequentially, or the engine ICE and the first motor EM1 transmit torque to the differential mechanism DM for driving via the first input shaft S1, the gearwheel G3, the second input shaft S2, the gearwheel G6, the gearwheel G5 and the output shaft S3 sequentially, and the second motor EM2 transmits torque to the differential mechanism DM for driving via the gearwheel G8, the gearwheel G7, the gearwheel G6, the gearwheel G5 and the output shaft S3 sequentially.

When the hybrid power system is in the second hybrid power driving mode,
the engine ICE is in an operating state,
the first motor EM1 is in the operating state and the second motor EM2 is in a stopped state, or the first motor EM1 and the second motor EM2 are both in the operating state,
the Clutch K0 is engaged,
in the transmission AMT, the first synchronous meshing mechanism A1 is engaged with the gearwheel G1, and the second synchronous meshing mechanism A2 is engaged with the gearwheel G5.

In this way, the engine ICE and the first motor EM1 transmit torque to the differential mechanism DM for driving via the first input shaft S1, the gearwheel G1, the gearwheel G2 and the output shaft S3, or the engine ICE and the first motor EM1 transmit torque to the differential mechanism DM via the first input shaft S1, the gearwheel G1, the gearwheel G2 and the output shaft S3 sequentially, and the second motor EM2 transmits torque to the differential mechanism DM for driving via the gearwheel G8, the gearwheel G7, the gearwheel G6, the gearwheel G5 and the output shaft S3 sequentially.

When the hybrid power system is in the third hybrid power driving mode,
the engine ICE is in an operating state,
the first motor EM1 is in the operating state and the second motor EM2 is in a stopped state, or the first motor EM1 and the second motor EM2 are both in the operating state,
the Clutch K0 is engaged,
in the transmission AMT, the first synchronous meshing mechanism A1 is engaged with the gearwheel G3, and the second synchronous meshing mechanism A2 is engaged with the gearwheel G4.

In this way, the engine ICE and the first motor EM1 transmit torque to the differential mechanism DM for driving via the first input shaft S1, the gearwheel G3, the gearwheel G4 and the output shaft S3, or the engine ICE and the first motor EM1 transmit torque to the differential mechanism DM for driving via the first input shaft S1, the gearwheel G3, the gearwheel G4 and the output shaft S3, and the second motor EM2 transmits torque to the differential mechanism DM for driving via the gearwheel G8, the gearwheel G7, the gearwheel G6, the second input shaft S2, the gearwheel G3, the gearwheel G4 and the output shaft S3 sequentially.

Further, as shown in Table 1, the hybrid power system can be controlled by the control module of the hybrid power system to implement an idle charge mode.

When the hybrid power system is in the idle charge mode,
the engine ICE is in an operating state;
the first motor EM1 is in the operating state and the second motor EM2 is in a stopped state;
the clutch K0 is engaged;
in the transmission AMT, the first synchronous meshing mechanism A1 is in the neutral position where the first synchronous meshing mechanism is disengaged from the corresponding gearwheels (gearwheels G1 and G3), and the second synchronous meshing mechanism A2 is in the neutral position where the second synchronous meshing mechanism is disengaged from the corresponding gearwheels (gearwheels G4 and G5).

In this way, the engine ICE transmits torque to the first motor EM1 to enable the first motor EM1 to charge the battery.

Further, as shown in Table 1, the hybrid power system can be controlled by the control module of the hybrid power system to implement a serial mode.

When the hybrid power system is in the serial mode,
the engine ICE, the first motor EM1 and the second motor EM2 are all in an operating state;
the clutch K0 is engaged;
in the transmission AMT, the first synchronous meshing mechanism A1 is in the neutral position where the first synchronous meshing mechanism is disengaged from the corresponding gearwheels (gearwheels G1 and G3), and the second synchronous meshing mechanism A2 is engaged with the gearwheel G4 or the gearwheel G5.

In this way, the engine ICE transmits torque to the first motor EM1 to enable the first motor EM1 to charge the battery, and the second motor EM2 transmits torque to the differential mechanism DM for driving via the gearwheel G8, the gearwheel G7, the gearwheel G6, the second input shaft S2, the gearwheel G3, the gearwheel G4 and the output shaft S3, or via the gearwheel G8, the gearwheel G7, the gearwheel G6, the gearwheel G5 and the output shaft S3.

Based on the operating mode of the hybrid power system shown in Table 1, if torque used for driving is required to be output, the hybrid power system may employ the following operating method:
- when the charge level of the battery of the hybrid power system is greater than or equal to a first predetermined threshold value, the requested driving power is less than the maximum battery output power of the battery, and the hybrid power system employs the pure motor driving mode (the first pure motor driving mode or the second pure motor driving mode);
- when the charge level of the battery is less than the first predetermined threshold value and is greater than or equal to a second predetermined threshold value, the overall system efficiency of the whole hybrid power system in the pure motor driving modes and in the hybrid power driving modes is calculated respectively based on the thermal efficiency of the engine, the motor and the power electronic control average efficiency thereof and the charge/discharge efficiency of the battery, the overall system efficiency corresponding to the pure motor driving modes is compared with the overall system efficiency corresponding to the hybrid power driving modes, and the hybrid power system employs the driving mode bringing higher overall system efficiency; and
- when the charge level of the battery is less than the second predetermined threshold value, the hybrid power system employs the serial mode.

It should be noted that the first predetermined threshold value and the second predetermined threshold value described above may be values obtained according to different vehicle types, battery performance, and other parameters. In this way, the first predetermined threshold value and the second predetermined threshold value can be flexibly set according to different vehicles and batteries.

When the charge level of the battery is less than the first predetermined threshold value and is greater than or equal to the second predetermined threshold value, a switch between the driving modes is required based on the comparison of the overall system efficiency, and at the moment, the switch is carried out by delaying a predetermined amount of time. In this way, the hybrid power system can be prevented from being frequently switched between different driving modes. In addition, when the charge level of the battery is less than the first predetermined threshold value and is greater than or equal to the second predetermined threshold value, the overall system efficiency corresponding to the different driving modes needs to be repeatedly compared, so as to adjust the hybrid power system to implement the most suitable driving mode in time.

The overall system efficiency of the hybrid power system, for example, may be calculated according to the product of different parameters in the thermal efficiency of the engine, the motor and the power electronic control average efficiency thereof, and the charge/discharge efficiency of the battery. Specifically, in the pure motor driving mode, the overall system efficiency may be calculated by using the product of the motor and the power electronic control average efficiency thereof, and the charge/discharge efficiency of the battery, while in the hybrid power driving mode, the overall system efficiency may be calculated by using the product of the thermal efficiency of the engine, the motor and the power electronic control average efficiency thereof, and the charge/discharge efficiency of the battery.

In addition, based on the operating mode of the hybrid power system shown in Table 1, in the case that the torque used for driving is not required to be output by the hybrid power system, the idle charge mode may be employed if the state of charge of the battery is too low.

The operating method of the hybrid power system according to the present disclosure is described in detail above, and a torque distribution method used in the case that the torque used for driving is required to be output by the hybrid power system will be described below.

(Torque Distribution Method)

Based on the pure motor driving modes (the first pure motor driving mode and the second pure motor driving mode) and the hybrid power driving modes (the first hybrid power driving mode, the second hybrid power driving mode, and the third hybrid power driving mode) of the hybrid power system shown in Table 1, the hybrid power system may employ the following torque distribution method in the case that the torque used for driving is required to be output.

When the hybrid power system is in the pure motor driving mode, whether in the first pure motor driving mode or in the second pure motor driving mode, the transmission ratio from the input/output shaft of the second motor EM2 to the output shaft S3 of the transmission AMT is greater than the transmission ratio from the input/output shaft of the first motor EM1 to the output shaft S3 of the transmission AMT. Therefore, the rotating speed of the second motor EM2 is constantly greater than that of the first motor EM1, such that the second motor EM2 is more susceptible to work under a high-efficiency working condition than the first motor EM1. Based on this, the torque input by the second motor EM2 to the transmission AMT is set firstly according to the requested torque, wherein when the requested torque is greater than the maximum rated torque of the second motor EM2, the torque of the first motor EM1 is set on the basis of the difference between the requested torque and the maximum rated torque of the second motor EM2.

When the hybrid power system is in the hybrid power driving mode, the thermal efficiency of the engine, the motor and the power electronic control average efficiency thereof, and the charge/discharge efficiency of the battery are taken into account, and the torque of the engine ICE and the torque of the first motor EM1 are set according to the requested torque, wherein when the requested torque is greater than the sum of the actual engine torque of the engine ICE and the actual motor torque of the first motor EM1, the torque of the second motor EM2 is set based on the difference between the requested torque and the sum of the actual engine torque and the actual motor torque.

It should be noted that when the hybrid power system is in the pure motor driving mode, the torque input by the first motor EM1 to the transmission AMT is also limited by various factors. That is, the torque input by the first motor EM1 to the transmission AMT is less than or equal to the maximum allowable input torque of the first input shaft S1 of the transmission AMT, and the torque input by the first motor EM1 to the transmission AMT is also less than or equal to the value of the torque that can be output by the first motor EM1 which is calculated on the basis of the maximum output power of the battery.

In addition, when the hybrid power system is in the hybrid power driving mode, the torque of the first motor EM1 is set based on the difference between the requested torque and the actual engine torque, and it should also be ensured that the sum of the actual engine torque and the actual motor torque is less than or equal to the maximum allowable input torque of the first input shaft S1 of the transmission AMT. Torque input by the second motor EM2 to the transmission AMT is also limited by various factors. That is, the torque input by the second motor EM2 to the transmission AMT is less than or equal to the maximum allowable torque of the second input shaft S2 of the transmission AMT, and the torque input by the second motor EM2 to the transmission AMT should be less than or equal to the value of the torque that can be output by the second motor EM2 which is calculated on the basis of the maximum output power of the battery.

The torque distribution method of the hybrid power system according to the present disclosure is described in detail above, and the gear shifting control method of the hybrid power system in the pure motor driving mode and in the hybrid power driving mode will be described below.

(Gear Shifting Control Method)

The gear shifting control method of the hybrid power system will be illustrated below by taking, a gear shift process in which the hybrid power system in FIG. 2 is switched from the first pure motor driving mode to the second pure motor driving mode, a gear shift process in which the hybrid power system is switched from the first hybrid power driving mode to the second hybrid power driving mode, and a gear shift process in which the hybrid power system is switched from the second hybrid power driving mode to the third hybrid power driving mode, as examples.

Figure 3A:
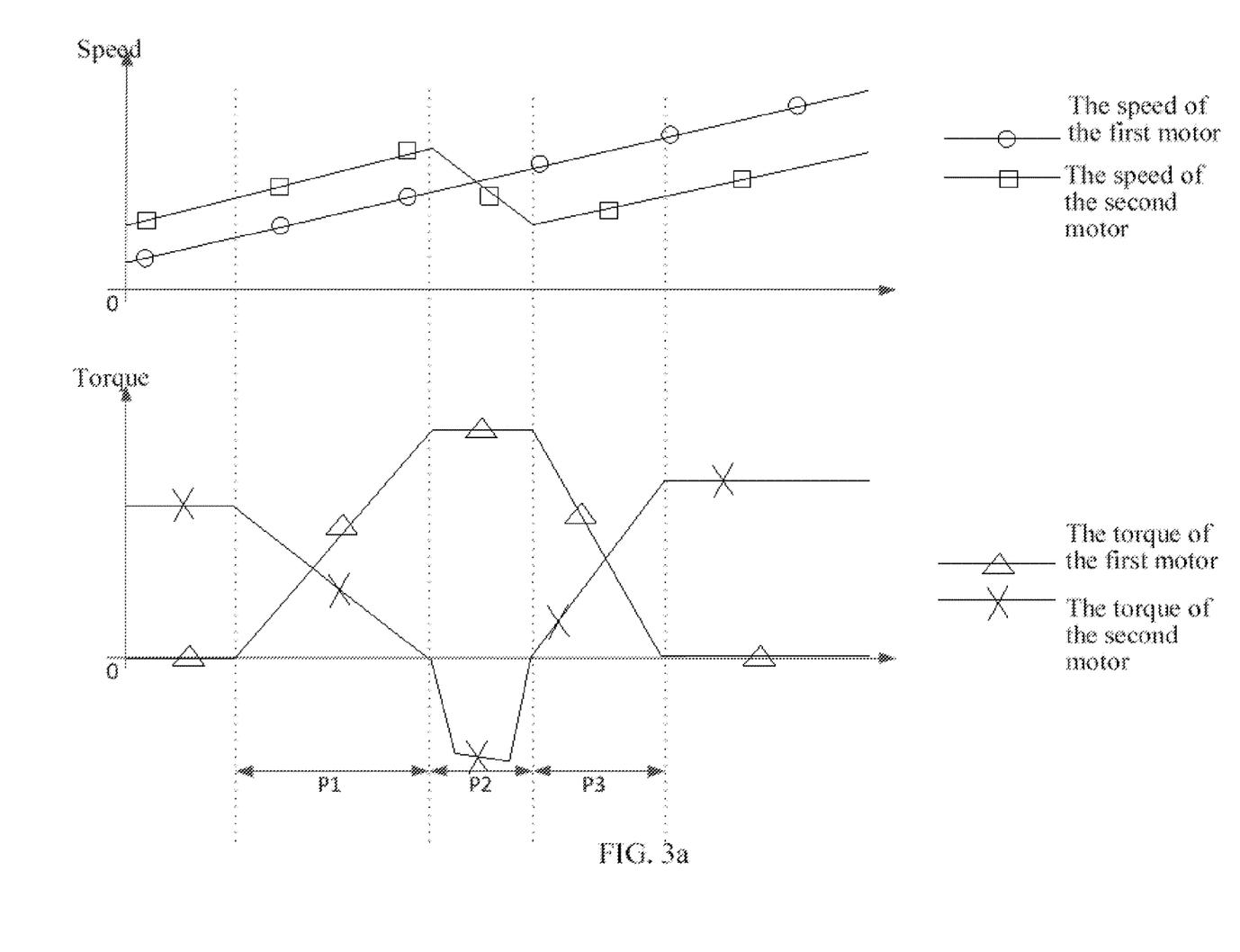
FIG. 3a illustrates a plot of the change in various parameters over time in an example of the hybrid power system in FIG. 2 shifting gears in a pure motor driving mode.

As shown in FIG. 3a, when the hybrid power system is switched from the first pure motor driving mode to the second pure motor driving mode to shift gears, the gear shifting control method according to the present disclosure comprises three phases P1-P3 in a chronological order described below.

A torque transfer is carried out in the first phase P1, wherein the torque of the second motor EM2 is controlled to be decreased gradually to 0 Nm within a predetermined amount of time; the torque of the first motor EM1 is controlled to be increased gradually to the maximum torque based on parameters such as the power of the first motor EM1 and the output power of the battery. In this way, the torque for driving in the hybrid power system can be maintained as much as possible.

Further, in the first phase P1, the speed of the first motor EM1 and the speed of the second motor EM2 are both controlled to be increased gradually.

After the torque of the second motor EM2 being decreased to 0 Nm and the torque of the first motor EM1 being increased to the maximum torque, the second phase P2 is implemented.

In the second phase P2, firstly, the second synchronous meshing mechanism A2 is controlled to be disengaged from the gearwheel G5. Then, the second motor EM2 is controlled to implement a speed control mode, and the torque of the second motor EM2 is controlled to be decreased rapidly to a negative value, be maintained at the negative value within a certain period of time, and then be quickly returned to 0 Nm, such that the speed of the second motor EM2 is decreased gradually to drive the gearwheel G4 to adjust the speed. In this way, by controlling the second motor EM2 to adjust the speed, match the speed of the gearwheel G4 with the speed of the second synchronous meshing mechanism A2. Further, after matching the speed of the gearwheel G4 with the speed of the second synchronous meshing mechanism A2, the gearwheel G4 is controlled to be engaged with the second synchronous meshing mechanism A2.

After the gearwheel G4 being engaged with the second synchronous meshing mechanism A2, the third phase P3 is implemented, wherein the torque transfer is still carried out in the third phase P3. The torque of the second motor EM2 is controlled to be gradually increased to the target motor torque, and the torque of the first motor EM1 is controlled to be decreased gradually to 0 Nm. In this way, the torque for driving in the hybrid power system can be maintained as much as possible.

After the third phase P3 being completed, the hybrid power system may control the torque of the first motor EM1 and the torque of the second motor EM2 according to the torque distribution method described above.

Figure 3B:
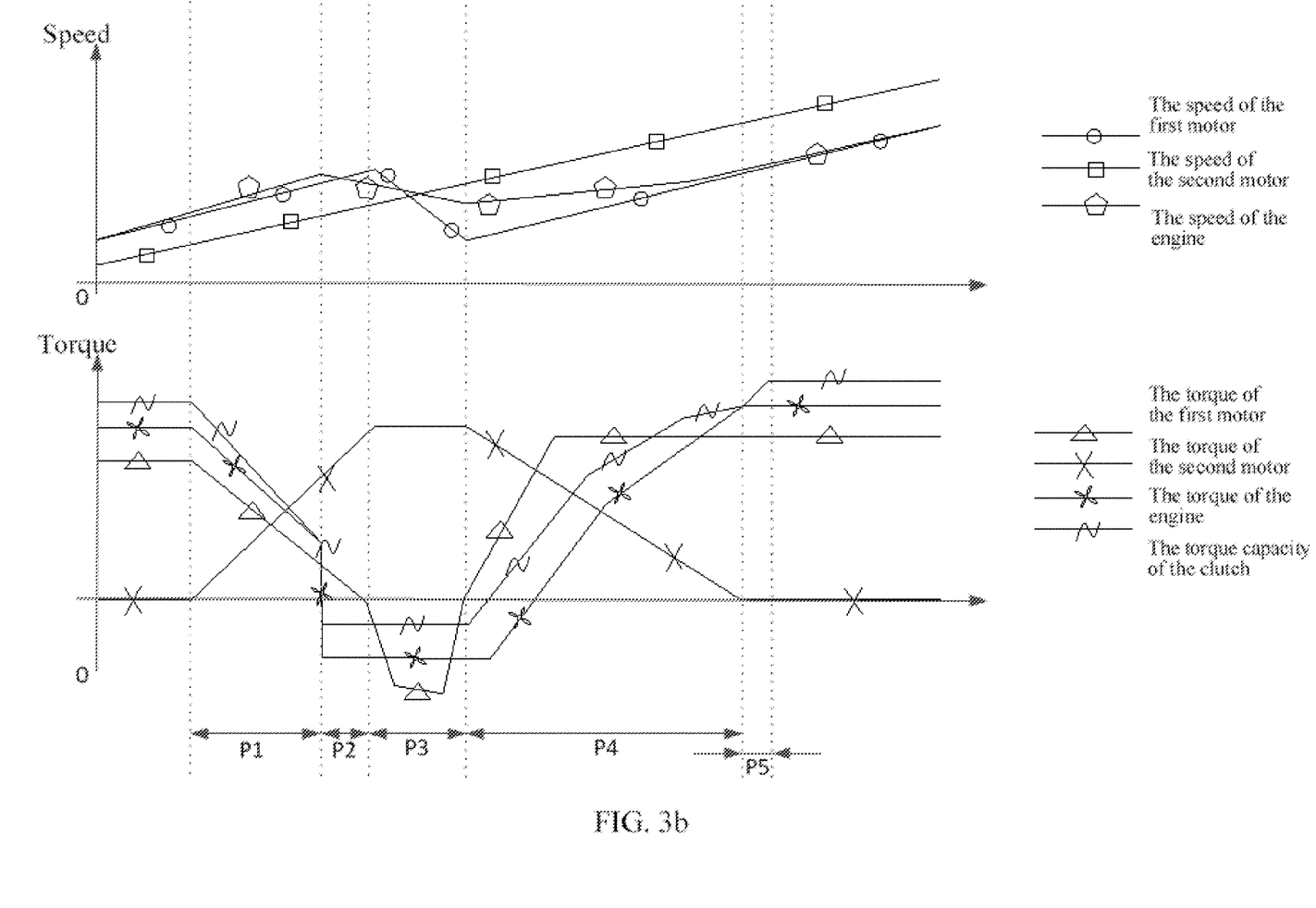
FIG. 3b illustrates a plot of the change in various parameters over time in a first example of the hybrid power system in FIG. 2 shifting gears in a hybrid power driving mode.

As shown in FIG. 3b, when the hybrid power system is switched from the first hybrid power driving mode to the second hybrid power driving mode to shift gears, the gear shifting control method according to the present disclosure comprises five phases P1-PS in a chronological order as described below.

A torque transfer is carried out in the first phase P1, wherein within a predetermined amount of time (e.g., a predetermined amount of calibration time), when the clutch K0 is engaged, the torque capacity of the clutch K0, the torque of the engine ICE, and the torque of the first motor EM1 are all controlled to be decreased gradually to corresponding predetermined values, and the torque of the second motor EM2 is controlled to be increased gradually based on the parameters such as the power of the second motor EM2 and the output power of the battery. In this way, the torque for driving in the hybrid power system can be maintained as much as possible.

Further, in the first phase P1, the speed of the first motor EM1, the speed of the second motor EM2, and the speed of the engine ICE are all controlled to be increased gradually.

After the torque capacity of the clutch K0 and the torque of the engine ICE being decreased to the predetermined values, the second phase P2 is implemented.

In the second phase P2, the clutch K0 is disengaged firstly, and the torque capacity of the clutch K0 and the torque of the engine ICE are further controlled to be decreased rapidly to respective negative values and be maintained at the respective negative values, such that the speed of the engine ICE is decreased to approach the speed of the first input shaft S1 of the transmission AMT.

In addition, the torque transfer proceeds in the second phase P2, such that the torque of the first motor EM1 is decreased gradually to 0 Nm and the torque of the second motor EM2 is increased to the maximum torque. In the phase, the speed of the first motor EM1 and the speed of the second motor EM2 are increased gradually. In this way, the torque for driving in the hybrid power system can be maintained as much as possible.

After the torque of the first motor EM1 being decreased to 0 Nm, the third phase P3 is implemented.

In the third phase P3, the first synchronous meshing mechanism A1 is controlled to be disengaged from the gearwheel G3. Then, the first motor EM1 is controlled to implement a speed control mode, and the torque of the first motor EM1 is controlled to be decreased rapidly to a negative value, be maintain at the negative value within a certain period of time, and then be returned to 0 Nm, such that the speed of the first motor EM1 is decreased gradually to drive the first synchronous meshing mechanism A1 to adjust the speed. In this way, by controlling the first motor EM1 to adjust the speed, match the speed of the first synchronous meshing mechanism A1 with that of the gearwheel G1. Further, after matching the speed of the first synchronous meshing mechanism A1 with that of the gearwheel G1, the first synchronous meshing mechanism A1 is controlled to be engaged with the gearwheel G1.

In the third phase P3, the torque of the second motor EM2 is maintained at the maximum torque thereof and the speed of the second motor EM2 is increased gradually. The torque of the engine ICE and the torque capacity of the clutch K0, respectively, remain unchanged at the values in the second phase P2, such that the speed of the engine ICE is decreased gradually and further approaches the speed of the first input shaft S1 of the transmission AMT.

After the first synchronous meshing mechanism A1 being engaged with the gearwheel G1, the fourth phase P4 is implemented.

The torque transfer is carried out again in the fourth phase P4, the torque of the first motor EM1 is increased gradually to the target motor torque and then remains unchanged, and the torque of the second motor EM2 is decreased gradually to 0 Nm. The torque of the engine ICE and the torque capacity of the clutch K0 are both increased, and the torque capacity of the clutch K0 is remained to be constantly greater than the torque of the engine ICE in this phase, whereby finally the torque of the engine ICE and the torque capacity of the clutch K0 are both increased to a value equal to the target engine torque.

In this phase, the speed of the first motor EM1 and the speed of the second motor EM2 are both increased gradually, and the speed of the engine ICE further gradually approaches the speed of the first input shaft S1 of the transmission AMT.

After the torque of the engine ICE and the torque capacity of the clutch K0 both being increased to a value equal to the target engine torque, the fifth phase P5 is implemented.

In the fifth phase P5, the speed of the engine ICE further gradually approaches the speed of the first input shaft S11 of the transmission AMT, and eventually their speeds match. At the moment, the clutch K0 is engaged and the torque capacity of the clutch K0 is increased, such that the torque capacity of the clutch K0 is greater than the target engine torque of the engine ICE.

After the third phase P5 being completed, the hybrid power system may control the torque of the first motor EM1, the torque of the second motor EM2, and the torque of the engine ICE according to the torque distribution method described above.

Figure 3C:
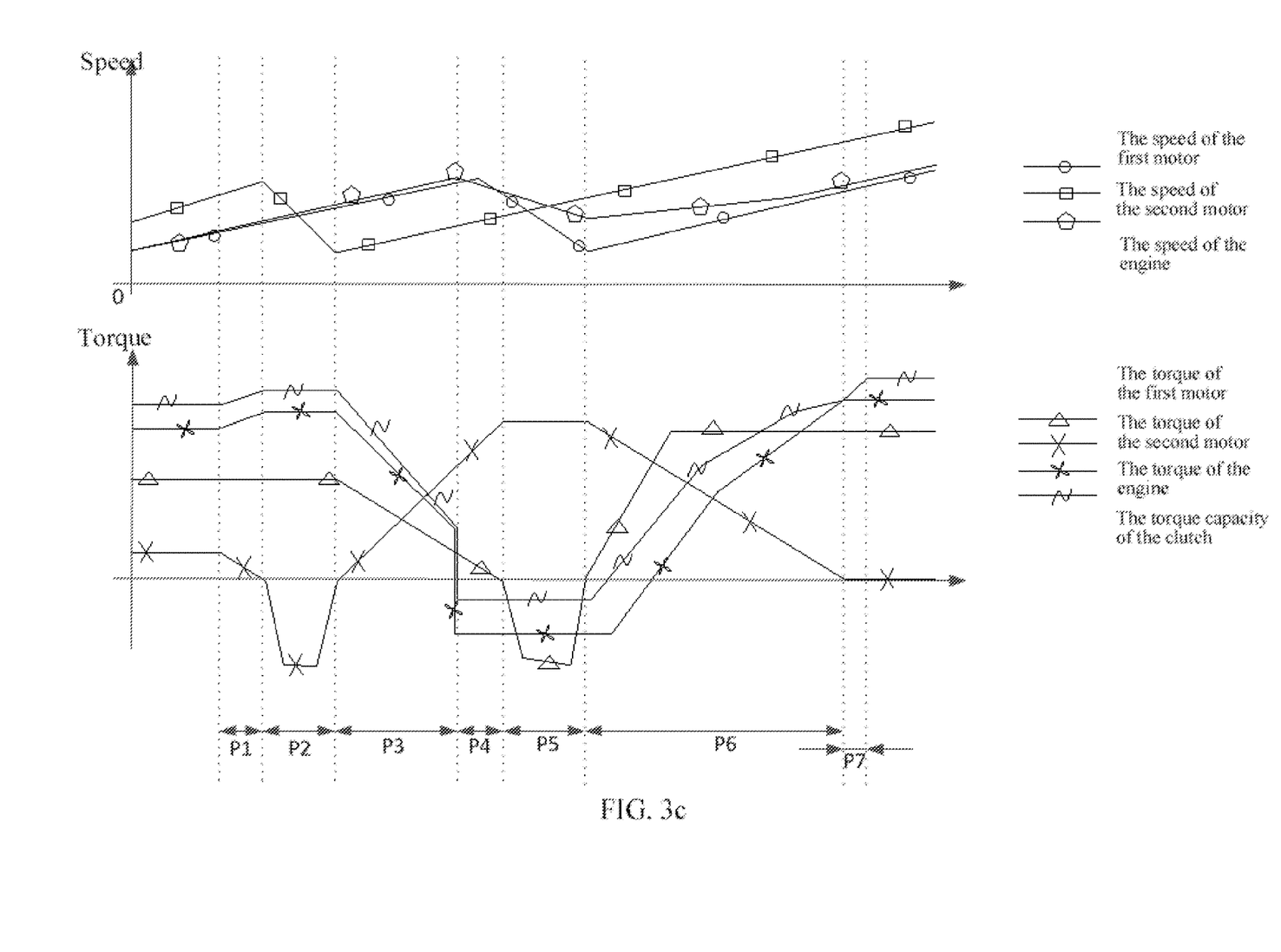
FIG. 3c illustrates a plot of the change in various parameters over time in a second example of the hybrid power system in FIG. 2 shifting gears in the hybrid power driving mode.

As shown in FIG. 3c, when the hybrid power system is switched from the second hybrid power driving mode to the third hybrid power driving mode to shift gears, the gear shifting control method according to the present disclosure comprises seven phases P1-P7 in a chronological order as described below.

A torque transfer is carried out in the first phase P1, wherein within a predetermined amount of time, the torque of the second motor EM2 is controlled to be decreased gradually to 0 Nm, the torque of the engine ICE and the torque capacity of the clutch K0 are controlled to be increased gradually, and the torque of the first motor EM1 is controlled to remain unchanged. In this way, the torque for driving in the hybrid power system can be maintained as much as possible.

Further, in the first phase P1, the speed of the first motor EM1, the speed of the second motor EM2, and the speed of the engine ICE are all controlled to be increased gradually.

After the torque of the second motor EM2 being decreased to 0 Nm, the second phase P2 is implemented.

In the second phase P2, the second synchronous meshing mechanism A2 is controlled to be disengaged from the gearwheel G5. Then, the second motor EM2 is controlled to implement a speed control mode, and the torque of the second motor EM2 is controlled to be decreased rapidly to a negative value, be maintained at the negative value within a certain period of time, and then be quickly returned to 0 Nm, such that the speed of the second motor EM2 is decreased gradually to drive the gearwheel G4 to adjust the speed. In this way, by controlling the second motor EM2 to adjust the speed, match the speed of the gearwheel G4 with the speed of the second synchronous meshing mechanism A2. Further, after matching the speed of the gearwheel G4 with the speed of the second synchronous meshing mechanism A2, the gearwheel G4 is controlled to be engaged with the second synchronous meshing mechanism A2.

In this phase, the torque of the first motor EM1, the torque of the engine ICE, and the torque capacity of the clutch K0 are equal to their respective values at the end of the first phase P1 and remain unchanged, and the speed of the first motor EM1 and the speed of the engine ICE are both increased gradually.

Further, the change process of the parameters in the subsequent third phase P3 to the seventh phase P7 is substantially the same as the change process of the parameters in the first phase P1 to the fifth phase P5 shown in FIG. 3b. The disengagement of the first synchronous meshing mechanism A1 from the gearwheel G1 and the engagement of the first synchronous meshing mechanism with the gearwheel G3 are achieved in the third phase P3 to the seven phase P7. Therefore, the specific processes of the third phase P3 to the seven phase P7 are not specified here.

In conclusion, the torque interruption phenomenon cannot occur in the gear shifting control method of the hybrid power system. Generally speaking, when the hybrid power system shifts gears in the pure motor driving mode, a torque compensation is carried out on the first motor EM1; when the hybrid power system shifts gears in the hybrid power driving mode, the torque compensation is carried out on the engine ICE and/or the first motor EM1 in the case that the second synchronous meshing mechanism A2 is disengaged from the corresponding gearwheels; and the torque compensation is carried out on the second motor EM2 in the case that the first synchronous meshing mechanism A1 is disengaged from the corresponding gearwheels.

Further, when the hybrid power system shifts gears, the gear shifting control method comprises a torque transfer process, prior to the disengagement of the synchronous meshing mechanisms A1 and A2 of the transmission AMT from the corresponding gearwheels.

When the hybrid power system shifts gears in the pure motor driving mode, in the torque transfer process, a torque transfer is carried out between the second motor EM2 and the first motor EM1, such that the torque compensation can be carried out on the first motor.

When the hybrid power system shifts gears in the hybrid power driving mode, in the torque transfer process, when the gear shift is carried out by the second synchronous meshing mechanism A2, the torque transfer is carried out between the second motor EM2 and the engine ICE and/or the first motor EM1, such that the torque compensation can be carried out on the engine ICE and/or the first motor EM1; when the gear shift is carried out by the first synchronous meshing mechanism A1, the torque transfer is carried out between the second motor EM2 and the engine ICE and the first motor EM1, such that the torque compensation can be carried out on the second motor EM2.

Specific embodiments of the present disclosure are set forth in detail above, but it should also be noted that:

as described herein, increase gradually or decrease gradually may illustrate that the parameters change continuously and substantially linearly; increase rapidly or decrease rapidly illustrate that the change slopes of the parameters are close to 90 degrees.

as described herein, match in speed may illustrate that the speeds are approximately the same, but not necessarily the same. In addition, unless indicated otherwise, the "speed" described herein refers to the rotation speed. For example, the engine speed refers to engine rotation speed, and the motor speed refers to motor rotation speed.

The invention claimed is:

1. A hybrid power system, comprising:
a transmission comprising a first input shaft, a second input shaft, an output shaft, and a plurality of synchronous meshing mechanisms and a plurality of gearwheels, the second input shaft sleeves the first input shaft, the second input shaft and the first input shaft are independently rotatable, the output shaft is arranged in parallel with the first input shaft and the second input shaft at intervals, wherein the shafts can be selectively in transmission connection via the plurality of synchronous meshing mechanisms and the plurality of gearwheels;
a first motor, wherein an input-output shaft of the first motor is in transmission connection with the first input shaft of the transmission;
a second motor, wherein an input-output shaft of the second motor is in transmission connection with the second input shaft of the transmission;
an engine and a clutch, wherein the engine is in transmission connection with the input-output shaft of the first motor via the clutch; and
a battery electrically connected with the first motor and the second motor;
wherein:
the plurality of synchronous meshing mechanisms include a first synchronous meshing mechanism and a second synchronous meshing mechanism, the first synchronous meshing mechanism is arranged on the first input shaft, and the second synchronous meshing mechanism is arranged on the output shaft;
the plurality of gear wheels including:
a first gearwheel corresponding to the first synchronous meshing mechanism and arranged on the first input shaft;
a second gearwheel fixed to the output shaft, the first gearwheel constantly meshes with the second gearwheel;
a third gearwheel corresponding to the first synchronous meshing mechanism and fixed to the second input shaft;
a fourth gearwheel corresponding to the second synchronous meshing mechanism and arranged on the output shaft, the third gearwheel meshes with the fourth gearwheel;
a fifth gearwheel corresponding to the second synchronous meshing mechanism and arranged on the output shaft; and
a sixth gearwheel fixed to the second input shaft, the fifth gearwheel constantly meshes with the sixth gearwheel.

2. The hybrid power system of claim 1, wherein
the input-output shaft of the first motor is directly and coaxially connected with the first input shaft, and
the input-output shaft of the second motor is in transmission connection with the second input shaft via a gearwheel transmission mechanism.

3. The hybrid power system of claim 1, wherein an eighth gearwheel fixed to the input-output shaft of the second motor meshes with a seventh gearwheel acting as an intermediate gearwheel, the seventh gearwheel constantly meshes with the third gearwheel or the sixth gearwheel, and the seventh gearwheel and the eighth gearwheel constitute the gearwheel transmission mechanism.

4. The hybrid power system of claim 3, further comprising a controller configured to control the hybrid power system so as to enable the hybrid power system to implement a pure motor driving mode,
wherein when the hybrid power system is in the pure motor driving mode, the engine is in a stopped state, the second motor is in an operating state and the first motor is in a stopped state; or
the first motor and the second motor are both in an operating state, the clutch is disengaged, and the synchronous meshing mechanisms of the transmission are engaged with the corresponding gearwheels, wherein the second motor transmits torque to the transmission for driving; or
the first motor and the second motor both transmit torque to the transmission to enable driving.

5. The hybrid power system of claim 4, wherein when the hybrid power system is in the pure motor driving mode,
the first synchronous meshing mechanism is engaged with the first gearwheel, and the second synchronous meshing mechanism is engaged with the fifth gearwheel; or
the first synchronous meshing mechanism is engaged with the first gearwheel, and the second synchronous meshing mechanism is engaged with the fourth gearwheel.

6. The hybrid power system of claim 5, wherein when the hybrid power system is in the pure motor driving mode, a transmission ratio from the input_output shaft of the second motor to the output shaft of the transmission is greater than a transmission ratio from the input/output shaft of the first motor to the output shaft of the transmission.

7. The hybrid power system of claim 6, wherein the hybrid power system is configured to be controlled by the controller of the hybrid power system to implement a hybrid power driving mode,
wherein when the hybrid power system is in the hybrid power driving mode, the engine is in the operating state, the first motor is in the operating state and the second motor is in the stopped state, or the first motor and the second motor are both in the operating state, the clutch is engaged, and the synchronous meshing mechanisms of the transmission are engaged with the corresponding gearwheels, such that the engine and the first motor transmit torque to the transmission for driving, or the engine, the first motor and the second motor transmit torque to the transmission for driving.

8. The hybrid power system of claim 7, wherein when the hybrid power system is in the hybrid power driving mode,
the first synchronous meshing mechanism is engaged with the third gearwheel, and the second synchronous meshing mechanism is engaged with the fifth gearwheel;

the first synchronous meshing mechanism is engaged with the first gearwheel, and the second synchronous meshing mechanism is engaged with the fifth gearwheel; or the first synchronous meshing mechanism is engaged with the third gearwheel, and the second synchronous meshing mechanism is engaged with the fourth gearwheel.

9. The hybrid power system of claim 7, wherein the hybrid power system is configured to be controlled by the controller of the hybrid power system to implement a serial mode,
when the hybrid power system is in the serial mode, the engine, the first motor and the second motor are all in the operating state, the clutch is engaged, the first synchronous meshing mechanism is located in a neutral position where the first synchronous meshing mechanism is disengaged from the corresponding gearwheels, and the second synchronous meshing mechanism is engaged with the fourth gearwheel or the fifth gearwheel, such that the engine transmits torque to the first motor to enable the first motor to charge the battery, and the second motor transmits torque to the transmission for driving.

10. The hybrid power system of claim 9, wherein the hybrid power system is configured to be controlled by the controller of the hybrid power system to implement an idle charge mode,
wherein when the hybrid power system is in the idle charge mode, the engine is in the operating state, the first motor is in the operating state and the second motor is in the stopped state, the clutch is engaged, and the synchronous meshing mechanisms of the transmission are in the neutral position, such that the engine transmits torque to the first motor to enable the first motor to charge the battery.

11. The hybrid power system of claim 10, wherein
when a charge level of the battery of the hybrid power system is greater than or equal to a first predetermined threshold value and a requested driving power is less than the maximum battery output power of the battery, the hybrid power system employs the pure motor driving mode;
when the charge level of the battery is less than the first predetermined threshold value and is greater than or equal to a second predetermined threshold value, an overall system efficiency of the hybrid power system in the pure motor driving mode and in the hybrid power driving mode is calculated respectively based on a thermal efficiency of the engine, the motor and a power electronic control average efficiency thereof and a charge-discharge efficiency of the battery, the overall system efficiency corresponding to the pure motor driving mode is compared with the overall system efficiency corresponding to the hybrid power driving mode, and the hybrid power system employs a driving mode bringing higher overall system efficiency; and
when the charge level of the battery is less than a second predetermined threshold value, the hybrid power system employs the serial mode.

12. The hybrid power system of claim 11, wherein when the charge level of the battery is less than the first predetermined threshold value and is greater than or equal to the second predetermined threshold value, the overall system efficiency corresponding to the pure motor driving mode is compared with an overall system efficiency corresponding to the hybrid power driving mode repeatedly, and when a switch between the pure motor driving mode and the hybrid power driving mode is based on a comparison of the overall system efficiency, the switch is carried out by delaying a predetermined amount of time.

13. The hybrid power system of claim 12, wherein the overall system efficiency corresponding to the pure motor driving mode and the overall system efficiency corresponding to the hybrid power driving mode are calculated according to a product of different parameters in the thermal efficiency of the engine, the motor and the power electronic control average efficiency thereof and the charge/discharge efficiency of the battery.

14. The hybrid power system of claim 10, wherein
when the hybrid power system is in the pure motor driving mode, the torque of the second motor is set according to a requested torque, and when the requested torque is greater than a maximum rated torque of the second motor, the torque of the first motor is set based on a difference between the requested torque and the maximum rated torque of the second motor; and
when the hybrid power system is in the hybrid power driving mode, the torque of the engine and the torque of the first motor are set according to the requested torque, and when the requested torque is greater than a sum of the torque of the engine and the torque of the first motor, the torque of the second motor is set based on a difference between the requested torque and the sum of the torque of the engine and the torque of the first motor.

15. The hybrid power system of claim 1, wherein
a torque compensation is carried out on the first motor when the hybrid power system shifts gears into a pure motor driving mode; and
when the hybrid power system shifts gears in the hybrid power driving mode, the torque compensation is carried out on the engine or the first motor in the case that the second synchronous meshing mechanism is disengaged from the corresponding gearwheel, and the torque compensation is carried out on the second motor when the first synchronous meshing mechanism is disengaged from the corresponding gearwheel.

16. The hybrid power system of claim 15, wherein when the hybrid power system shifts gears, before the synchronous meshing mechanisms of the transmission are disengaged from the corresponding gearwheels, a torque transfer is carried out by the gear shifting control method to achieve the torque compensation.

17. The hybrid power system of claim 16, wherein when the hybrid power system shifts gears in the pure motor driving mode, in a torque transfer process, the torque of the second motor is reduced and the torque of the first motor is increased, such that the torque compensation can be carried out on the first motor.

18. The hybrid power system of claim 16, wherein when the hybrid power system shifts gears in the hybrid power driving mode, in a torque transfer process,
when the gear shift is carried out by the second synchronous meshing mechanism, the torque of the second motor is reduced and the torque of the engine and/or the first motor is increased, such that the torque compensation can be carried out on the engine and/or the first motor; and
when the gear shift is carried out by the first synchronous meshing mechanism, both the torque of the engine and the torque of the first motor are reduced and the torque of the second motor is increased, such that the torque compensation can be carried out on the second motor.

19. A hybrid power system comprising:

a transmission of the hybrid power system that includes a first and second input shaft and a first and second motor, wherein the first and second motor are in transmission connection with the first and second input shafts respectively, and an engine in transmission connection with either the first motor or the second motor via a clutch;

a plurality of synchronous meshing mechanisms and a plurality of gearwheels, wherein the second input shaft sleeves the first input shaft, the second input shaft and the first input shaft are independently rotatable, and an output shaft is arranged in parallel with the first input shaft and the second input shaft at intervals, wherein at least the first input shaft and the second input shaft can be selectively in transmission connection via the plurality of synchronous meshing mechanisms and the plurality of gearwheels; and a controller configured to control the hybrid power system to activate a pure-motor driving mode, wherein in the pure-motor driving mode, the engine is in a stopped state, the second motor is in an operating state, and the first motor is in a stopped state;

wherein:
the plurality of synchronous meshing mechanisms include a first synchronous meshing mechanism and a second synchronous meshing mechanism, the first synchronous meshing mechanism is arranged on the first input shaft, and the second synchronous meshing mechanism is arranged on the output shaft;

the plurality of gear wheels including:
a first gearwheel corresponding to the first synchronous meshing mechanism and arranged on the first input shaft;
a second gearwheel fixed to the output shaft, the first gearwheel constantly meshes with the second gearwheel;
a third gearwheel corresponding to the first synchronous meshing mechanism and fixed to the second input shaft;
a fourth gearwheel corresponding to the second synchronous meshing mechanism and arranged on the output shaft, the third gearwheel meshes with the fourth gearwheel;
a fifth gearwheel corresponding to the second synchronous meshing mechanism and arranged on the output shaft; and
a sixth gearwheel fixed to the second input shaft, the fifth gearwheel constantly meshes with the sixth gearwheel.

\* \* \* \* \*